United States Patent

De Vos et al.

[11] Patent Number: 5,968,651
[45] Date of Patent: Oct. 19, 1999

[54] STEEL CORD WITH DIFFERENTLY WAVED FILAMENTS

[75] Inventors: Xavier De Vos, Oudenaarde; Yvan Lippens, Vichte, both of Belgium

[73] Assignee: N.V. Bekaert S.A., Zwevegem, Belgium

[21] Appl. No.: 08/921,611

[22] Filed: Sep. 2, 1997

[30] Foreign Application Priority Data

Oct. 3, 1996 [EP] European Pat. Off. ............. 96 202759

[51] Int. Cl.$^6$ .................................. D07B 1/06; B06C 9/20
[52] U.S. Cl. .................... 428/377; 428/364; 428/382; 57/212; 57/213; 57/214; 57/237; 57/902
[58] Field of Search .................................... 428/364, 377, 428/382; 57/212–214, 237, 902

[56] References Cited

FOREIGN PATENT DOCUMENTS

| | | |
|---|---|---|
| 0 462 716 | 12/1991 | European Pat. Off. . |
| 0 551 124 | 7/1993 | European Pat. Off. . |
| 0 619 398 | 10/1994 | European Pat. Off. . |
| 89/09305 | 10/1989 | WIPO . |
| 95/16816 | 6/1995 | WIPO . |

OTHER PUBLICATIONS

Patent Abstract of Japan vol. 18, No.68 JP 5 279974 (1994).
"Polygonally Preformed Steel Elements" *Research Disclosure* pp. 359–365 (1994).

*Primary Examiner*—Richard Weisberger
*Attorney, Agent, or Firm*—Foley & Lardner

[57] ABSTRACT

A steel cord (10) adapted for the reinforcement of elastomeric products comprises a core and a layer arranged around the core. The core comprises one to four core filaments (12) and the layer comprises three to ten layer filaments (14). At least one of the core filaments (12) have a first wave form and at least one of the layer filaments (14) have a second wave form such that the first wave form is substantially different from said second wave form.

This allows to control the size of the micro-gaps and to guarantee rubber penetration.

15 Claims, 1 Drawing Sheet

STEEL CORD WITH DIFFERENTLY WAVED FILAMENTS

FIELD OF THE INVENTION

The present invention relates to a steel cord adapted for the reinforcement of elastomeric products such as rubber tires, conveyor belts, timing belts, . . . .

BACKGROUND OF THE INVENTION

Since a few decades the art of steel cords has known a continuous trend towards simpler constructions comprising fewer and thicker filaments and requiring fewer manufacturing steps.

In this way steel cords comprising multiple strands have been replaced by layered steel cord constructions, i.e. steel cords comprising a core and one or more layers such as a 3+6, a 3+9 and a 3+9+15. Of these layered steel cord constructions a 3+6 construction, such as a 3×0.20+6×0.35 construction, is a widely used construction.

Further continuing the above-mentioned trend and trying simultaneously to achieve full rubber penetration between the individual steel filaments of the steel cords, attempts have been made to replace this 3×0.20+6×0.35 construction by a 1+6 construction. The reason is that a 1+6 construction only requires one twisting step in the manufacturing whereas a 3+6 construction requires two twisting steps in the manufacturing. These attempts, however, have been unsuccessful up to now.

Replacement of a 3×0.20+6×0.35 by a 1×0.35+6×0.35 failed because the 1+6 suffered from core migration, bad compression behavior and because there was no rubber penetration between the six layer filaments and the core filament.

With a 1×0.38+6×0.35 construction, such as disclosed in WO-A-89/09305, the problem of core migration was at least partially solved, but the construction still suffered in some cases from an insufficient degree of rubber penetration due to the possible shifting of the filaments in the layer towards each other and thus causing interstices where rubber can no longer penetrate.

Another disadvantage is the use of two different diameters with the resulting danger of confusion of filaments during industrial production and of even a greater risk of core migration in case the thicker filament is located in the layer instead of in the core.

Another attempt has been to propose a $1 \times d_1 + 6 \times d_2$ construction where one or more of the layer filaments had been plastically deformed in such a way that they obtain a wavy form. The object of this wavy form is to create micro-gaps between the layer filaments and the core filament to allow rubber to penetrate. Experiments, however, have shown that rubber penetration is only sufficient if the amplitude of the wave form becomes excessively large or if the core filament diameter $d_1$ is substantially larger than the layer filament diameter $d_2$.

A further attempt has been disclosed in EP-A-0 551 124 and in EP-A-0 619 398. Here the core filament has been subjected to a plastic deformation instead of the layer filaments in order to create the necessary micro-gaps between the layer filaments and the core filament. Here again, experiments have shown that rubber penetration is only sufficient with an excessively large wave amplitude or with a core filament diameter $d_1$ substantially larger than layer filament diameter $d_2$.

SUMMARY OF THE INVENTION

The invention aims at avoiding the disadvantages of the prior art. It is an object of the present invention to provide for a layered steel cord with a sufficient rubber penetration.

It is also an object of the present invention to provide for a layered steel cord with substantially equal filament diameters in core and in layer.

It is a further object of the present invention to provide for a layered steel cord which can be manufactured using only one twisting step.

It is another object of the present invention to provide for a steel cord which has a compression behavior which is substantially of the same level as a 3+6 construction.

According to the invention, there is provided a steel cord which comprises a core and a layer arranged around said core. The core comprises one to four core filaments and the layer comprises three to ten layer filaments. At least one of the core filaments has a first wave form and at least one of the layer filaments has a second wave form. The characterizing feature of the invention is that the first wave form is substantially different from the second wave form.

The terms "a first wave form substantially different from the second wave form" mean that the first wave form has an amplitude, a phase, a wave pitch, a series of harmonics (obtained by means of a mathematical Fourrier analysis on a projection of the wave form) or any combination of amplitude, phase, wave pitch or series of harmonics that is substantially different from the amplitude, phase, wave pitch, series of harmonics or corresponding combination thereof of the second wave form.

The core filament may have a planar wave form, i.e. a wave form which lies substantially in one plane, or a spatial wave form. The layer filaments have preferably a spatial wave form.

In a preferable embodiment of the steel cord according to the invention, the number of core filaments is equal to one, the number of layer filaments is equal to six, the core filament diameter is substantially equal to the layer filament diameter, the core filament has a so-called crimp form obtained by means of two toothed wheels and the layer filaments have been polygonally preformed such that a polygonal form such as disclosed in WO-A-95/16816 is obtained.

Indeed the inventors have discovered that the polygonal form is a suitable form for promoting rubber penetration if it is applied to filaments of the layer, i.e. to filaments located in the radially outer position of a transversal cross-section of a steel cord. Combining the polygonally preformed outer filaments with a spatial or a planar crimp form in the core filament allows to obtain a cord where the amplitude of the crimp form of the core filament can be reduced while maintaining the same degree of rubber penetration.

A preferable embodiment of the steel cord according to the invention meets one or more of following requirements:

the first wave form of the core filaments has a first amplitude which ranges from 1.3 to 1.8 times the diameter of the core filaments, preferably 1.3 to 1.6 times the diameter of the core filaments;

the first wave form of the core filaments has a first wave pitch which ranges from 10 to 20 times the diameter of the core filament;

the first wave form of the core filaments has a first wave pitch which ranges from 0.20 to 0.40 the layer twist pitch (layer twist pitch=twisting pitch of the layer filaments around the core);

the first wave form of the core filaments has a radius of curvature which is greater than 0.8 mm.

Within the context of the present invention the terms "twist pitch" are to be distinguished from the terms "wave pitch".

The terms "twist pitch" have the same meaning as the terms "lay length" and mean the axial distance required to make a 360 degree revolution of an element (filament or strand) in a strand or in a cord and is conveniently expressed in millimeters.

The terms "wave pitch" mean the axial distance required to make one cycle or period of a wave which is caused only by the preforming prior to twisting and not by the downstream twisting process. The wave pitch is also expressed in millimeters.

Both the wave pitch and the twist pitch are measured on the final cord after twisting.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
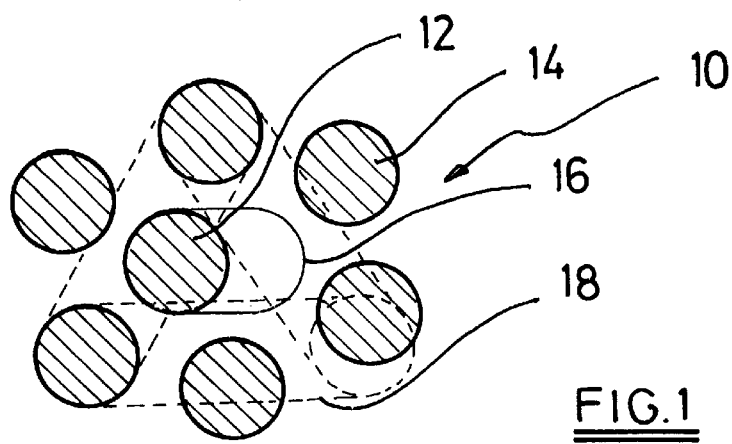
FIG. 1 shows a cross-section of a first embodiment of a steel cord according to the present invention.

FIG. 1 shows the transversal cross-section of a first embodiment of a steel cord 10 according to the present invention. A single core filament 12 is surrounded by six layer filaments 14. The single core filament 12 has a crimp wave form lying substantially in one plane. This is illustrated by the dash lines 16. The surrounding layer filaments 14 have a polygonal wave form illustrated by the dash lines 18.

Figure 2:
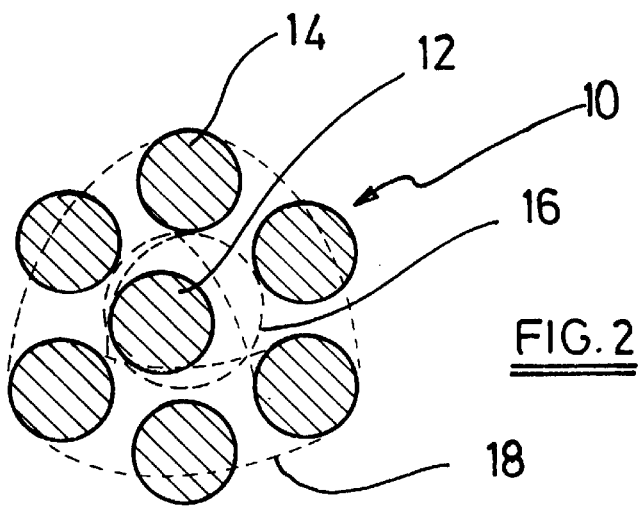
FIG. 2 shows a cross-section of a second embodiment of the steel cord according to the present invention.

FIG. 2 shows the transversal cross-section of a second embodiment of a steel cord according to the present invention. The difference with the embodiment of FIG. 1 is that the core filament 12 now has a spatial wave form 16 instead of a substantially planar wave form.

A possible explanation for the high degree of rubber penetrability of the steel cords according to the present invention is as follows. Applying the same wave form (i.e. same phase, same amplitude, same wave pitch and same harmonics) to both the core filaments and the layer filaments results only in a high degree of rubber penetration if the filaments of the cord are not subjected to external forces. As soon as external forces such as a bending or a pulling force are acting upon the filaments of the cord, the core and the layer wave form "fit" into one another thereby closing the created micro-gaps and making complete rubber penetration impossible. Differentiating the first wave form of the core filaments from the second wave form of the layer filaments prevents the wave forms from fitting into one another due to the action of external forces. As a consequence, micro-gaps remain under any circumstances open and rubber penetration is guaranteed.

Figure 3:
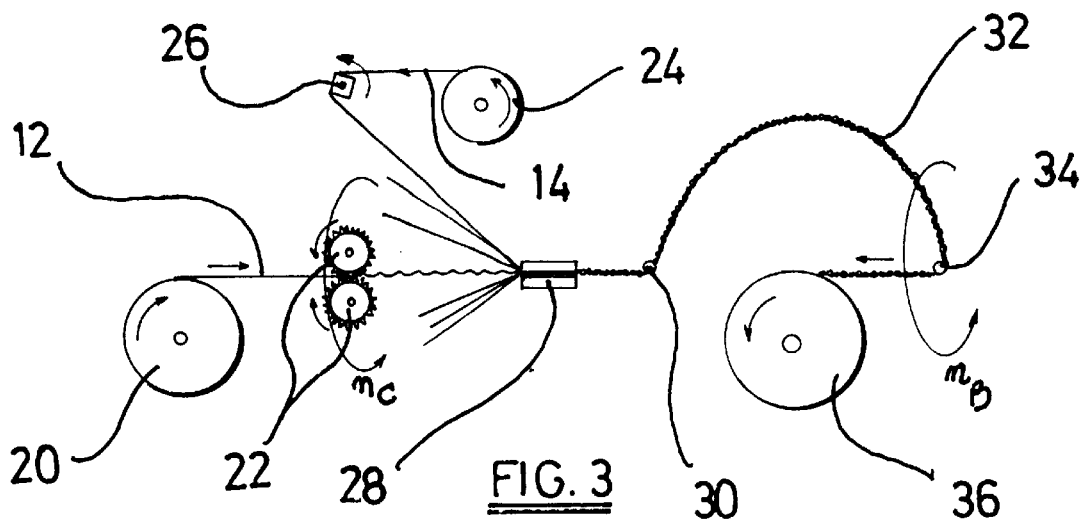
FIG. 3 shows a method of manufacturing a steel cord according to the present invention.

FIG. 3 illustrates schematically a way of manufacturing a steel cord according to the present invention.

Starting from the left side of FIG. 3, a core filament 12 is unwound from a supply spool 20 and is guided through two toothed wheels 22 which give a crimp form to the core filament. The two toothed wheels 22 may or may not be subjected to a rotation $n_c$ around an axis which coincides substantially with the path of core filament 12. Dependent upon the exact rotational speed nc and upon the direction of rotation, a spatial or a planar wave form for the core filament may be obtained.

Six layer filaments 14 are unwound from supply spools 24 and are guided to a preformer 26. Preformer 26 is not externally driven but rotates under influence of the passing layer filaments 14. Preformer 26 gives to the filaments 14 a radius of curvature that alternates between a maximum and a minimum. The action of preformer 26 together with the action of the downstream double-twister results in a polygonal form of layer filaments 14.

A more detailed description and analysis of polygonal preforming may be found in the already cited patent application WO-A-95/16816. The crimped core filament 12 and the polygonally preformed layer filaments 14 are brought together at assembly point 28 and are guided to a double twister: they are led via guiding pulley 30 where they receive a first twist, over a rotating flyer 32 (which rotates at a rotational speed $n_B$) and a reversing pulley 34, where they receive a second and final twist, to a spool 36, where the twisted cord 10 is wound.

A steel cord according to the invention has been compared with other steel cord construction with respect to rubber penetration and compression behavior.

The table on the following page summarizes the results.

TABLE

| cord construction | top-bottom amplitude of the wave form of the core filament | rubber penetration | | compression behavior | |
|---|---|---|---|---|---|
| | | aspect ratio (%) | pressure drop (in %) | compression buckling stress (MPa) | deformation at buckling point (%) |
| 3 × 0.20 + 6 × 0.35 prior art | — | 0 | 7 | 360 | 0.53 |
| 0.35 + 6 × 0.35 HT reference | 0.35 (no wave) | 0 | 100 | 293 | 0.84 |
| 0.38 + 6 × 0.35 HT prior art | 0.38 (no wave) | 0 | 98 | 431 | 0.51 |
| 0.35 + 6 × 0.35 BETRU ® HT reference | 0.35 (no wave) | 35 | 73 | 397 | 0.44 |
| 0.38 + 6 × 0.35 BETRU ® HT reference | 0.38 (no wave) | 40 | 0 | 401 | 0.48 |
| 0.35 cr + 6 × 0.35 HT prior art | 0.59 | 30 | 0 | 390 | 0.49 |
| 0.35 cr + 6 × 0.35 BETRU ® HT (=invention cord) | 0.51 | 40 | 0 | 389 | 0.49 |

BETRU® is a registered trademark of N.V. BEKAERT S.A. and refers to steel cords having one or more polygonally preformed filaments according to WO-A-95/16816.

The abbreviation "cr" means that the relevant filament has been guided between two toothed wheels and has a planar or spatial crimp form. The abbreviation "HT" means high tensile strength.

In the above table, the rubber penetration has been measured in two different ways.

A first way determines the so-called aspect ratio and is measured here on the core filament in the following way. The twisted cord is embedded in rubber under conditions comparable to manufacturing conditions.

Thereafter the individual steel filaments are unraveled and the aspect ratio is the length of a particular steel filament covered with rubber compared with the total length of that particular steel filament. A second way is the convenient and well known pressure drop test.

As may be derived from the above table, the invention cord allows to maintain and even improve rubber penetration, despite a decrease in amplitude of the wave form of the core filament.

It may also be derived from the above table that the invention cord obtains a substantially equal compression behavior as a 3+6 construction. In comparison with a 3+6 construction, however, the invention cord has the advantage of requiring only one twisting step in the manufacturing and of allowing a much higher degree or rubber penetration.

We claim:

1. A steel cord adapted for the reinforcement of elastomeric products, said steel cord comprising a core and a layer arranged around said core, said core comprising one to four core filaments, said layer comprising three to ten layer filaments, at least one of said core filaments having a first wave form, at least one of said layer filaments having a second wave form, said first wave form being substantially different from said second wave form.

2. A steel cord according to claim 1 wherein said first wave form has a first amplitude and said second wave form has a second amplitude, said first amplitude being substantially different from said second amplitude.

3. A steel cord according to claim 1 wherein said first wave form has a first wave pitch and said second wave form has a second wave pitch, said first wave pitch being substantially different from said second wave pitch.

4. A steel cord according to claim 1, wherein said second wave form is spatial.

5. A steel cord according to claim 1, wherein said first wave form is substantially planar.

6. A steel cord according to claim 1, wherein said first wave form is substantially spatial.

7. A steel cord according to claim 1, wherein said first wave form is a crimp form.

8. A steel cord according to claim 1, wherein said second wave form is a polygonal form.

9. A steel cord according to claim 1, wherein the number of core filaments is equal to one.

10. A steel cord according to claim 1, wherein the number of layer filaments is equal to six.

11. A steel cord according to claim 1, wherein the diameter of the core filaments is equal to the diameter of the layer filaments.

12. A steel cord according to claim 9, wherein the first amplitude range s from 1.3 to 1.8 times the diameter of the core filament.

13. A steel cord according to claim 9, wherein the first wave pitch ranges from 1.0 to 20 times the diameter of the core filament.

14. A steel cord according to claim 9, wherein the layer filaments are twisted with a layer twist pitch around the core and wherein the first wave pitch ranges from 0.20 to 0.40 times the layer twist pitch.

15. A steel cord according to claim 1, wherein the first wave has a radius of curvature which is greater than 1.0 mm.

* * * * *